Sept. 1, 1942.   F. BUECHMANN   2,294,869
MOVEMENT FOR MEASURING INSTRUMENTS
Filed July 15, 1941   2 Sheets-Sheet 1
Fig. 1.
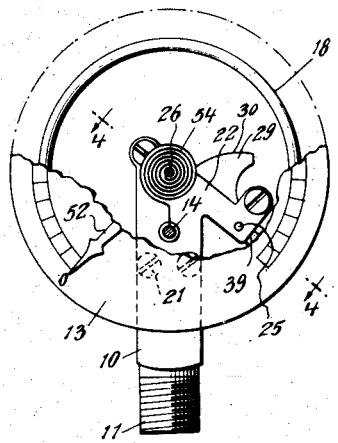
Fig. 2.
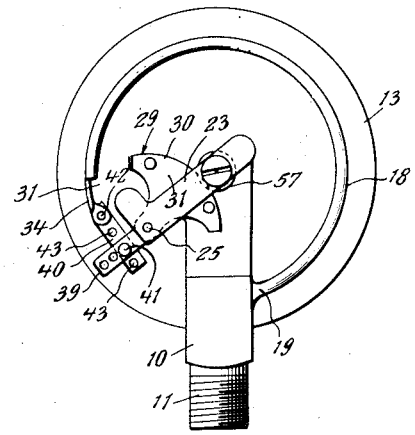
Fig. 3.
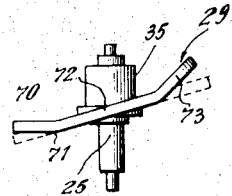
Fig. 4.
Fig. 5.
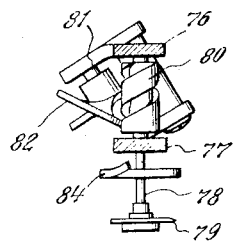
Fig. 6.
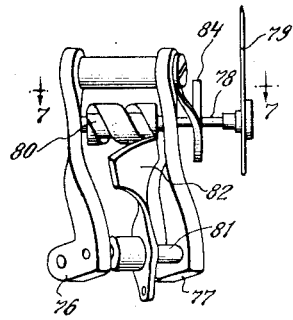
Fig. 7.
INVENTOR.
Frederick Buechmann
BY John P. Chandler
his Attorney Sept. 1, 1942.　　　F. BUECHMANN　　　2,294,869
MOVEMENT FOR MEASURING INSTRUMENTS
Filed July 15, 1941　　　2 Sheets-Sheet 2
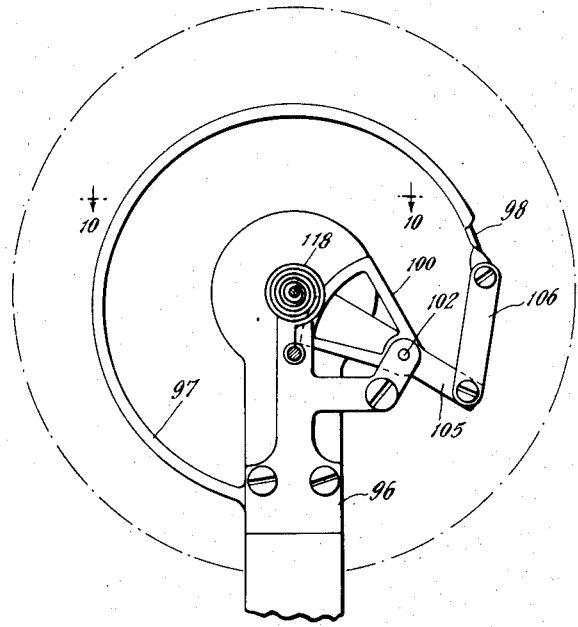
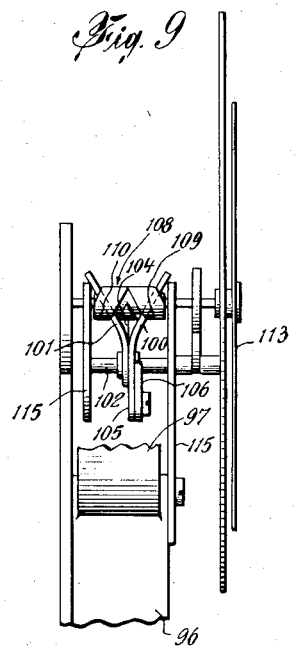
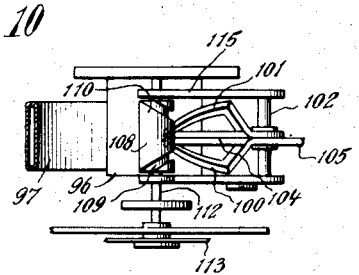
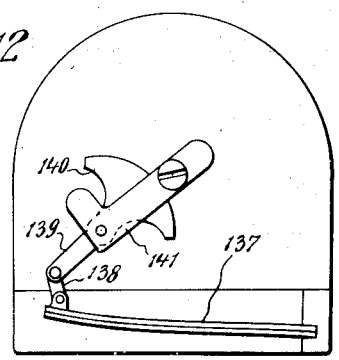
INVENTOR.
Frederick Buechmann
BY John P. Chandler
his Attorney Patented Sept. 1, 1942

2,294,869

UNITED STATES PATENT OFFICE 2,294,869

MOVEMENT FOR MEASURING INSTRUMENTS

Frederick Buechmann, New York, N. Y., assignor to Certified Gauge & Instrument Corp., Long Island City, N. Y., a corporation of New York Application July 15, 1941, Serial No. 402,470

20 Claims. (Cl. 73—109)

This invention relates to improvements in measuring instruments, and relates more particularly to an improved mechanical movement designed primarily, though not exclusively, for use in pressure gauges, temperature-indicating devices, and measuring instruments generally.

Devices of this general character include some element which is responsive to changes in conditions of one kind or another, such element comprising a member which is movable in one direction as the given condition, such as fluid pressure, increases, and movable in the opposite direction as the condition decreases. In pressure gauges, temperature gauges, tachometers, speed-indicating devices, and the like, this member has a relatively limited extent of movement, and a mechanical movement must be employed to translate this motion into rotary movement in a pointer shaft.

The movement generally used for this purpose is a conventional segmental toothed gear serving as the driving element, and a small driven pinion carried on the pointer shaft. Measuring instruments having such movements, however, are accurate for only a relatively short time due to the fact that the responsive element changes its normal position at zero as a result of use or special conditions, such as temperature, and difficulty has always been experienced in providing means for resetting the pointer to zero. Other objections to this type of movement lie in the fact that the gear teeth wear out in a short time, that backlash is present virtually all the time, and that when the pressure is suddenly dropped the pointer "slams" back to zero with such force that the parts become inaccurate quickly.

It is one of the principal objects of the present invention to provide an improved movement which will eliminate all of the difficulties incidental to the segmental toothed driving gear and small driven pinion on the pointer shaft, the invention consisting essentially of a sector-shaped driving gear operatively connected with the movable element which is responsive to the changes in conditions, such gear being free from teeth and having a single driving surface or edge rotatable in a plane at substantially right angles to the axis of the driven shaft, when the two shafts are parallel although the invention is by no means limited to parallel driving and driven shafts, as will be pointed out in some greater detail hereinafter. This latter shaft is connected with, or carries, a spiral gear having a single thread or fin formed thereon.

In the preferred embodiment of the invention, the driving gear drives the driven gear in one direction only, a conventional hair spring or other means driving the pointer shaft in the opposite direction as the driven gear is released by opposite rotation of the driving gear. Also, in the preferred embodiment the driven gear includes a single helical thread having one or more convolutions, and of a radius considerably less than the radius of the driving gear. There is thus provided a point contact between the driving gear and the driven gear, and the factor of wear between the driving and driven elements is negligible, and such uniform wear as takes place results in more accurate functioning of the parts.

Another particular object of the invention is the provision of a mechanical movement of the type described, wherein there is provided a rolling action between the driving gear and the driven gear; such action besides providing a minimum of friction, provides an especially smooth action on the part of the indicator. When the driving and driven shafts are parallel with each other and the lead angles of the two elements correspond generally, a substantially true rolling action is provided, but in the event that the shafts are parallel and it is desired to speed up the movement, the lead angle of the driving element is increased and there is accordingly a measure of slippage between the two elements since the circumferential speed, or pitch line velocity of the driving element is then less than that of the driven element. Due to the fact that there is only one driving surface, and ample clearance between the non-driving face of the driving gear and the non-driven face of the driven gear, vibration or shock in the non-driven direction is not transmitted directly between the elements.

In the presently used curved rack and pinion movement, the reverse condition exists, for although only one side of the gear teeth of the driving rack are used to impart rotation to the pinion, return movement being accomplished by the hair spring, there nevertheless cannot be sufficient clearance provided between the complement teeth of the rack and pinion to eliminate the backward and forward motion being transmitted between the two elements.

Another important object of the present invention is the provision of a movement of the character described wherein the driving element consists of a single, elongated flat or curved surface, the general contour of which lies at an angle to a plane of its rotation, and the driven element consists of a single, elongated spiral surface which is engaged in a point or surface contact by the driving element, there being a progressive and unbroken engagement between the two surfaces as the one drives the other. This progressive and unbroken engagement between both elements distinguishes the present invention from the devices of the art wherein there is either a progressive engagement by the surface of only one of the elements, or a progressive movement wherein the engagement is discontinuous and not unbroken. An example of the former device is a spiral driven element and a driving element moving in a plane parallel with the axis of the driven element, and an example of the latter device is the conventional spur gears normally used in measuring instruments.

In the preferred embodiment of the invention, the driving element consists of a single gear and in a modified form of the invention, two oppositely facing sector-shaped driving gears are provided, and two oppositely disposed spiral threads are formed on the driven gear, the two outer or two inner surfaces of the driving gears engaging the two inner or the two outer surfaces of the spiral threads, respectively, thus eliminating any thrust parallel to the axis of the driven gear.

Another object of the present invention is the provision of novel means for resetting the pointer shaft to zero in a measuring instrument movement wherein the driving or the driven element is a spiral member, this being accomplished by a delicate adjusting means for moving the driven element longitudinally of its axis.

Yet another object of the invention is the provision of a novel method of calibrating a movement of the character described. The novelty of this method resides in the operation of varying any portion of the elongated face of the driving or driven element. The method is illustrated in connection with the driving only and its important resides in the fact that the movement can be quickly speeded up in any part of its range, or throughout its entire range, and more important still, movement of the driven element can be reduced to zero. This feature of the method permits action of the driving element above and below the limits of the normal range without transmitting such violent action to the driven element.

A still further object of the invention is the provision of a novel movement for measuring instruments wherein violent action at either extremity of the normal range is not transmitted to the pointer shaft, and accordingly, a much lighter pointer, such as one formed from plastic material, may be used since the pointer is never slammed against the stop at each end.

In the drawings:

Fig. 1 is a front elevation of the preferred embodiment of the present invention as applied to a fluid pressure gauge using a curved Bourdon tube, a portion of the dial being broken away to show certain of the interior working parts.

Fig. 2 is a rear elevation thereof.

Fig. 3 is a broken top plan view of the device shown in Fig. 2.

Fig. 4 is a section taken on line 4—4 of Fig. 1.

Fig. 5 is a top plan view of the sector driving gear and illustrating a method of calibrating the instrument.

Fig. 6 is a front elevation of a modified form of the invention wherein the driving and driven shafts are non-parallel.

Fig. 7 is a section taken on line 7—7 of Fig. 6.

Fig. 8 is a front elevation of a second modified form of the invention wherein a double driving gear is employed.

Fig. 9 is a broken side elevation of the structure shown in Fig. 8.

Fig. 10 is a broken section taken on line 10—10 of Fig. 8.

Fig. 11 shows one form of the present invention as applied to a fluid pressure gauge of the diaphragm type.

Fig. 12 shows the present invention as applied to a temperature-measuring instrument employing a bi-metallic element.

The device of Figs. 1–4, inclusive, includes a central block 10 through which the fluid enters, such block having a threaded lower terminal 11 which is secured to the fluid conduit (not shown). A dial 13 is secured to the block 10 by means of screws 14, such dial being positioned adjacent to the front edge of a generally cylindrical casing (not shown). A curved Bourdon tube 18 of conventional construction is rigidly mounted at its inner end 19 in the block 10, the tube communicating with the interior of the block to permit the fluid under pressure to enter such tube.

A pair of frame members 22 and 23 are suitably mounted on the block by means of screws 21, and are held in spaced position by means of bushings 24. Between such frame members a shaft 25 carrying the driving element and a pointer shaft 26 carrying the driven element are suitably journalled, all as shown clearly in Fig. 4. The driving element consists of a sector-shaped driving gear 29 having a curved peripheral edge 30, the general contour of the surface of such gear lying at an angle or angles to a plane of its rotation. Driving gear 29 may be made from sheet metal, plastic, or other material, although it is preferably formed from metal, as by die stamping or casting, and provided with a gear facing 31 formed of plastic material, as shown in Fig. 4.

Prior to calibration of the movement, the entire driving surface of driving gear 29 may lie entirely on one plane, such plane being at an angle, as aforesaid, to its plane of rotation and corresponding generally to the lead angle of the driven gear. Driving gear 29 is desirably secured to a bushing 35, which is preferably keyed to shaft 25 by means of a set screw 36. If desired the bushing may be formed integrally with the shaft.

The sector-shaped driving gear 29 is formed with an extension portion 39 lying on the opposite side of pivot 25, and a link 40 is pivotally connected at one end thereof by means of a pin 41 to such extension 39, and is further connected by means of a pin 42 to the free end 34 of the Bourdon tube. In order to effect initial adjustment of the parts prior to calibration, link 40 and extension 39 are desirably provided with a plurality of spaced apertures 43.

Driven gear 46 may be former integrally with, or may be suitably mounted on, or adjacent to, driven shaft 26, such gear comprising a generally cylindrical member 47 having on its outer periphery a spiral thread or fin 48 of substantially uniform lead angle from end to end. The driving surface 50 of the thread desirably lies at more than a right angle to a plane tangent to the cylinder, thus providing substantially a point contact between its surface and driving surface 30 of driving gear 29.

A pointer 52 is mounted on the forward end of shaft 26, and in the arrangement shown the pointer shaft is caused to be driven from zero upwards by the sector-shaped driving gear, and is driven in the opposite direction by means of a hair spring 54, such return movement being limited by opposite rotation of driving gear 29, when viewed as in Fig. 1. In other words, as the pressure in tube 18 increases, the free end 34 thereof moves upwardly, thus bringing about progressive rotation of driving gear 29, and also rotation of driven gear 46. As the pressure drops, however, driving gear 29 rotates in the opposite direction, thus progressively releasing driven gear 46 for rotation, which rotation is effected by the action of the hair spring.

The following novel means are provided for permitting pointer 52 to be instantly reset to zero when the pressure in tube 18 is neutral. A hollow, internally threaded bushing 57 is secured in an aperture 58 in alignment with shaft 26, the inner terminal of such shaft being formed with a tapered recess 56 which receives the inner conical end 59 of a set screw 60. If desired, the recess may be formed in the set screw 60 and the inner end of the shaft 26 pointed and received in said recess. It will thus be seen that as set screw 60 is manually rotated by the use of a screw driver, shaft 26 will be moved toward the front of the instrument, and accordingly be rotated in a clockwise direction against the action of spring 54, as a result of contact of spiral thread or fin 48 with driving gear 29. Thus, set screw 60 can be rotated in either direction until the pointer 52 is at zero, and when this is achieved, further rotation of set screw 60 is restrained by tightening set screw 62.

Fig. 5 illustrates the sector driving gear with its variable face and the method of forming the desired driving surface will now be described. It was earlier pointed out that the entire surface prior to calibration generally lay on one plane and this plane is illustrated by the broken lines in Fig. 5. To the extent that this surface is initially flat, when the gear is stamped from sheet metal, it is not a helical element, although after it is properly formed it may have a generally helical surface.

The tool which is normally used to change any desired portion of the elongated gear face is not illustrated since it is a simple bifurcated member in the nature of a small wrench which receives any portion of the outer marginal edge of the gear and a handle extending from the bifurcated portions at right angles thereto and may be manually moved. For instance, it is desired to straighten portion 70 so that it lies at right angles to the axis and thus impart no rotative movement to the driven element in this area. The small wrench is inserted over the peripheral edge of the gear at point 71 and portion 70 bent to assume the position shown. Likewise if it is desired to give a greater or lesser angle in central portion 72, the same procedure may be followed. In the gear shown the opposite end 73 has been bent at a greater angle to a plane of rotation of the element than is central portion 72 in order to considerably speed up the movement when this end section engages the driven spiral gear.

After a gear has been appropriately formed with either a flat surface, a helical or curved surface, or an angular surface, as shown in Fig. 5, it will be appreciated that a suitable die can be made to stamp the gears to the same shape without requiring individual calibration of such gears. The gears may also be cast to exact shape.

In Figs. 6 and 7, the frame members 76 and 77 at their upper ends support the pointer shaft 78 carrying pointer 79 and driven spiral gear 80 and the lower terminals of the frame members which rotatably support driving shaft 81 have been bent to cause said driving shaft 81 to lie at a distinct angle to driven shaft. In this instance also, the driving gear 82 rotates spiral gear 80 in one direction only against the influence of hair spring 84, the latter driving the shaft in the opposite direction as it is released by the driving gear. When the two shafts are parallel as in the preferred embodiment, the lead angle of driving gear corresponds to the lead angle of the driven gear. When the shafts are not parallel, or as shown in Figs. 6 and 7, the lead angles of the two elements may or may not be the same, but the face of the driving element still lies in a plane or planes corresponding generally to the lead angle of the driven element.

The embodiment illustrated in Figs. 8, 9 and 10 also includes, as does the first embodiment, a hollow block 96 supporting a Bourdon tube 97 having a free end 98. This structure differs from that of the preferred embodiment in that a pair of oppositely disposed, sector-shaped driving gears 100 and 101 are mounted on driving shaft 102 instead of the single driving gear of the preferred embodiment. These driving gears 100 and 101 have the same lead angle, one lying on one side of a central plane of rotation, and the other lying on the other side thereof. The two gears may be secured together along their meeting edges, as shown at 104, and gear 100 is formed with an extension 105 which is connected with the free end 98 of the Bourdon tube by means of a pivoted link 106.

Driven gear 108 is formed with oppositely disposed spiral threads 109 and 110 which may meet at the center, the opposed side walls of the threads being engaged by the driving gears 100 and 101, respectively. Driven gear 108 is mounted on or is formed integrally with shaft 112 carrying a pointer 113 thereon, such shaft, as well as shaft 102, being journalled in frame members 115. In this instance, it will be noted from an examination of Fig. 9 that the threads 109 and 110 are somewhat wider than in the preferred embodiment, and either side wall formed by the threads may be employed as the driven surface, depending upon which direction hair spring 118 is wound. This wider thread may also be used in the preferred embodiment with a single diving cam.

In Fig. 11 the invention is shown as applied to a diaphragm type of fluid-pressure-responsive element designated as 125 formed with an inlet 126 for the fluid. A lever 127 is pivoted at the outer end of a fixed horizontal arm 128, and a link 129 is pivotally secured at its lower end to the outer end of lever 127, and at its upper end to a portion 131 of driving gear 130 lying opposite shaft 135. This shaft is journalled in frame 132, and the driving gear 130 contacts driven element 133. A lug 136 is soldered or otherwise secured at a suitable point on the upper surface of the diaphragm and which raises or lowers lever 127 in accordance with pressure changes in the chamber of 125.

In Fig. 12 the invention is shown as applied to a measuring instrument for temperatures employing a bimetallic element 137. At the outer or free end thereof, it is connected by means of a link 138 to a portion 139 of driving gear 140 pivotally mounted in the frame 141.

Whether the shafts carrying the driving or driven elements are parallel or not depends upon conditions such as space requirements, nature of the responsive element, and the extent of movement available for translation to the pointer shaft. As long as the shafts are parallel, or substantially so, either of such shafts may be provided with the shaft-shifting means 56—62, shown in Figs. 3 and 4. In the event that the spiral fins or threads are made wider so as to form, in effect, a spiral recess, and the hair spring drive thereby eliminated, adjusting means for shifting the shaft longitudinally of its axis will be formed at each end thereof. Also, this shifting means, in the case of either the driving or driven shafts, may comprise an annular collar on, or an annular slot formed in, the shaft, and the adjusting means engaging such collar or slot.

The foregoing embodiments of the invention are shown as applied to only three types of measuring instruments. It will be apparent, however, that the invention is by no means limited to such instruments.

What I claim is:

1. A movement for a measuring instrument having means responsive to changes in conditions, a pointer shaft and a pointer carried thereby, said movement including a driven gear formed with a spiral thread of substantially uniform lead throughout its length, driving means including a gear for rotating the driven gear in one direction and formed with an elongated gear face operating against one surface of the external thread and causing progressive engagement between the respective gear faces during rotation, and spring means for rotating the driven gear in the opposite direction as rotation in such direction is permitted through non-driving rotation of the driving gear, the elongated gear face lying on an angle corresponding to the lead angle of the external thread.

2. A movement for a measuring instrument having means responsive to changes in conditions, a pointer shaft and a pointer carried thereby, said movement including a driven gear formed with an external spiral thread, driving means including a sector-shaped gear formed with an elongated gear face contacting a surface of the external thread for rotating the driven gear in one direction, and causing progressive engagement between the respective gear faces during such rotation, and a hair spring for rotating the driven gear in the opposite direction as rotation in such direction is permitted through non-driving rotation of the driving gear, the major portion of the elongated gear face lying on an angle corresponding to the lead angle of the external thread and exerting a thrust thereagainst, one end portion of said gear face lying on a plane substantially parallel to a plane of rotation of the driven element to arrest movement of the driven element when such area engages a portion of the external thread.

3. A movement for a measuring instrument having means responsive to changes in conditions, a pointer shaft and a pointer carried thereby, said movement including a driven gear formed with a spiral thread externally thereof, of substantially uniform lead throughout its length, driving means including a sector-shaped pivoted gear for rotating the driven gear in one direction and formed with an elongated gear face contacting one surface of the external thread and causing progressive engagement between the respective gear faces, and a spring for rotating the driven gear in the opposite direction as rotation in such direction is permitted through non-driving rotation of the driving gear, portions of the elongated gear face lying on an angle disposed to the lead angle of the external thread, and another portion of said gear face lying substantially more nearly parallel to a plane of rotation of the driven element to impart lesser limited movement to the driven element when such area engages a portion of the external thread.

4. A movement for a measuring instrument having means responsive to changes in conditions, a pointer shaft and a pointer carried thereby, said movement including a driven gear formed with a spiral thread externally thereof of substantially uniform lead throughout its length, driving means including a sector-shaped pivoted gear for rotating the driven gear in one direction and formed with an elongated gear face contacting one surface of the external thread and causing progressive engagement between the respective gear faces, and a spring for rotating the driven gear in the opposite direction as rotation in such direction is permitted through non-driving rotation of the driving gear, portions of the elongated gear face lying on an angle disposed to the lead angle of the external thread, and another portion of said gear face lying more nearly parallel to the axis of the driven element to impart more rapid movement to the driven element when such area engages a portion of the external thread.

5. A movement for a measuring instrument having means responsive to changes in conditions, said movement comprising a pointer shaft, a pointer carried thereby and a driven element associated with the pointer shaft and comprising a driven gear formed with a spiral thread, driving means for the driven element comprising spring means for rotating the pointer shaft in one direction and a sector-shaped gear for driving the pointer shaft in the opposite direction, said driving gear being formed with an elongated driving surface, at least a portion of which corresponds generally to the lead angle of the spiral thread, said driving gear exerting a thrust against one surface of the external thread imparting rotative movement thereto and causing progressive engagement between the respective gear faces, and means connecting the responsive element with the driving gear.

6. A movement for a measuring instrument having means responsive to changes in conditions, said movement comprising a pointer shaft, a pointer carried thereby and a driven element operatively connected with the pointer shaft and comprising a driven gear formed with a spirally disposed external thread of substantially uniform lead throughout its length, driving means for the driven element comprising a spring for rotating the pointer shaft in one direction and a sector-shaped gear of rigid, bendable material formed with a curved peripheral edge for driving the pointer shaft in the opposite direction, said driving gear being formed with an elongated driving surface generally disposed to the lead angle of the external thread, said driving gear exerting a thrust against one surface of the external thread imparting rotative movement thereto and causing progressive engagement between the respective gear faces, and means connecting the responsive element to the driving gear.

7. An indicating mechanism for a measuring instrument having condition responsive means comprising a pointer shaft, a pointer carried thereby and a driven element operatively connected with the pointer shaft comprising a gear formed with a spirally disposed external thread of substantially uniform lead throughout its length, driving means for the driven element comprising spring means for rotating the pointer shaft in one direction and a sector-shaped, pivoted gear formed with a curved peripheral edge for driving the pointer shaft in the opposite direction, said peripheral edge engaging one surface of the spiral thread, and means connecting the condition responsive means of the instrument with said driving gear.

8. An indicating mechanism for a measuring instrument comprising means for translating movement of the condition responsive means of said instrument into rotary movement, said means comprising a pointer shaft, a pointer carried thereby, a driven element associated therewith comprising a spiral gear formed with a single thread of substantially uniform lead throughout its length, a sector-shaped driving gear formed with a driving surface adjacent to its peripheral edge and engaging one surface of the spiral gear, such driving surface lying on an angle corresponding generally to the helix angle of the spiral gear, spring means for driving the pointer shaft in one direction as the spiral gear is released through rotation of the sector gear, said latter gear driving the spiral gear and its shaft in the opposite direction against the spring, and means connecting the condition responsive means with the sector gear.

9. A movement for a pressure gauge having means responsive to changes in pressure, said movement comprising a pointer shaft, a pointer carried thereby and a driven element operatively connected with the pointer shaft and including a spiral thread of substantially uniform lead throughout its length forming a driven gear, driving means for the driven element comprising a spring for rotating the pointer shaft in one direction and a sector-shaped gear formed with a curved peripheral edge for driving the pointer shaft in the opposite direction, said driving gear being formed with an elongated driving surface corresponding generally to the lead angle of the external thread, a facing of plastic material for such driving surface, said driving gear exerting a thrust against one surface of the external thread imparting rotative movement thereto and causing progressive engagement between the respective gear faces, and means connecting the pressure responsive element to the driving gear.

10. A movement for a measuring instrument having means responsive to changes in conditions, comprising a pointer shaft, a pointer carried thereby, a driven gear carried by the shaft and being formed with a plurality of oppositely disposed spiral threads extending from substantially the center of the element to opposite ends thereof, a driving element comprising a plurality of oppositely facing sector-shaped driving gears lying on angles, respectively, corresponding generally to the lead angles of the spiral threads and exerting a thrust against such threads, imparting rotation to the driving gear and the pointer shaft.

11. In a movement for a measuring instrument having means responsive to changes in conditions, the combination of a pointer shaft and a pointer carried thereby, a driven element associated with the pointer shaft comprising a gear formed with an external spiral thread, driving means comprising a sector-shaped gear contacting the spiral thread for rotating the pointer shaft in one direction, means for rotating the pointer shaft in the opposite direction as the driven gear is released through opposite rotation of the driving gear, and means connecting the driving gear with the condition responsive means.

12. In a movement for a measuring instrument having means responsive to changes in conditions, the combination of a pointer shaft and a pointer carried thereby, a driven element associated with the pointer shaft comprising a gear formed with an external spiral thread, driving means comprising a sector-shaped gear contacting the spiral thread for rotating the pointer shaft in one direction, means exerting a continuing force on the shaft for driving the same in the opposite direction as the driven element is released through non-driving rotation of the driving gear, and means connecting the driving gear with the condition responsive means.

13. In a movement for a measuring instrument having means responsive to changes in conditions, the combination of a pointer shaft and a pointer carried thereby, a driven element associated with the pointer shaft comprising a gear formed with an external spiral thread, driving means comprising a spring for rotating the pointer shaft in one direction, and a sector-shaped gear formed with a generally helical face, contacting the spiral thread for rotating the pointer shaft in the opposite direction, and means connecting the driving gear with the condition responsive means.

14. In a movement for a measuring instrument having means responsive to changes in conditions, the combination of a pointer shaft and a pointer carried thereby, a driven element associated with the pointer shaft comprising a gear formed with an external spiral thread, driving means comprising a spring for rotating the pointer shaft in one direction, and a sector-shaped gear formed with a driving surface, contacting the spiral thread, for rotating the pointer shaft in the opposite direction, and means connecting the driving gear with the condition responsive means, a portion of the surface of said driving gear lying on an angle generally disposed to the helix angle of the spiral thread for imparting rotation to the driven element, said driving gear being formed with another portion lying substantially parallel to a plane of rotation of the driving gear which imparts substantially no rotation to the driven gear.

15. In a movement for a measuring instrument having means responsive to changes in conditions, the combination of a pointer shaft and a pointer carried thereby, a driven element associated with the pointer shaft comprising a gear formed with an external spiral thread, driving means comprising a spring for rotating the pointer shaft in one direction, and a sector-shaped gear formed with a driving surface, contacting the spiral thread, for rotating the pointer shaft in the opposite direction, and means connecting the driving gear with the condition responsive means, the surface of said driving gear lying on a plurality of planes relative to the helix angle of the spiral thread, the portions of such surface lying at a greater angle to a plane of rotation of the driving gear imparting more rapid rotation to the driven element than the portions lying more nearly parallel to a plane of rotation of said driving gear.

16. In a movement for a measuring instrument having means responsive to changes in conditions, the combination of a pointer shaft and a pointer carried thereby, a driven element associated with the pointer shaft comprising a pivotally mounted gear formed with an external spiral thread, driving means comprising a spring for rotating the pointer shaft in one direction, and a sector-shaped gear formed with a driving face, contacting the spiral thread for rotating the pointer shaft in the opposite direction, and means connecting the driving gear with the condition responsive means, the axis of the driving gear being non-parallel with the pointer shaft.

17. In a movement for a measuring instrument having a pointer shaft, a pointer carried thereby, a driven element, comprising a gear formed with a spiral thread, associated with the pointer shaft, and driving means comprising spring means for rotating the pointer shaft in one direction and a driving gear formed with a driving portion, contacting the spiral thread, for driving the driven gear in the opposite direction against the action of the spring, the combination of means for moving the shaft longitudinally of its axis to an adjusted, fixed position for resetting the pointer, said means comprising an adjustable element forming a thrust bearing and contacting a portion of the pointer shaft, whereby movement of the shaft in one direction or the other, through adjustment of the thrust bearing element, will impart rotation to the shaft by virtue of the contact between the driving gear and the spiral thread of the driven gear.

18. In a movement for a measuring instrument having means responsive to changes in conditions, the combination of a spiral driven gear, a pointer shaft associated with said driven gear and a pointer carried by the shaft, driving means for the driven gear comprising spring means for rotating the pointer shaft in one direction and a sector-shaped gear, operatively connected with the condition responsive means, for rotating the pointer shaft in the opposite direction against the action of the spring means, and means for resetting the pointer when the condition responsive means are neutral, said means comprising an adjustable element forming a thrust bearing and engaging a portion of the pointer shaft to move the same longitudinally of its axis, whereby movement of such element in one direction or the other, longitudinally of the shaft, will cause rotation of the shaft through contact between the driving gear and the driven gear.

19. In a movement for a measuring instrument having means responsive to changes in conditions, the combination of a pointer shaft and a pointer carried thereby, a driven element carried by the pointer shaft comprising a gear formed with an external spiral thread, driving means comprising a sector-shaped gear formed with an elongated driving face, contacting the spiral thread, for rotating the pointer shaft in one direction, means for rotating the pointer shaft in the opposite direction as the driven gear is released through opposite rotation of the driving gear, means connecting the driving gear with the condition responsive means, and means for resetting the pointer to zero when the responsive means are neutral, said means comprising an adjustable thrust bearing element for moving the pointer shaft longitudinally of its axis while the spiral thread is in contact with the driving gear, thus imparting rotation to the pointer shaft.

20. In a movement for a measuring instrument having means responsive to changes in conditions, the combination of a spiral driven gear, a pointer shaft associated with said driven gear and a pointer carried by the shaft, driving means for the driven gear comprising spring means for rotating the pointer shaft in one direction and a sector-shaped gear, operatively connected with the condition responsive means, for rotating the pointer shaft in the opposite direction against the action of the spring means, and means for moving the shaft longitudinally of its axis for resetting the pointer when the condition responsive means are neutral, said means comprising an adjustable element engaging one end of the pointer shaft forming a thrust bearing, whereby movement of such element in one direction or the other, longitudinally of the shaft, will cause rotation of the shaft through contact between the driving gear and the driven gear to permit resetting of the pointer.

FREDERICK BUECHMANN.